United States Patent
Sastri et al.

(10) Patent No.: US 9,637,415 B2
(45) Date of Patent: May 2, 2017

(54) METHOD OF MAKING HIGH PURITY POLYCRYSTALLINE ALUMINUM OXYNITRIDE BODIES USEFUL IN SEMICONDUCTOR PROCESS CHAMBERS

(71) Applicant: Surmet, Corp., Burlington, MA (US)

(72) Inventors: Suri A. Sastri, Lexington, MA (US); Sreeram Balasubramanian, Ashland, MA (US); Lee M. Goldman, Alliance, OH (US)

(73) Assignee: SURMET CORPORATION, Burlington, MA (US)

( * ) Notice: Subject to any disclaimer, the term of this patent is extended or adjusted under 35 U.S.C. 154(b) by 0 days.

(21) Appl. No.: 14/521,679

(22) Filed: Oct. 23, 2014

(65) Prior Publication Data
US 2015/0115507 A1    Apr. 30, 2015

Related U.S. Application Data

(60) Provisional application No. 61/894,968, filed on Oct. 24, 2013.

(51) Int. Cl.
| | |
|---|---|
| *C01B 21/082* | (2006.01) |
| *C04B 35/581* | (2006.01) |
| *C04B 35/58* | (2006.01) |
| *C04B 35/626* | (2006.01) |
| *C04B 35/645* | (2006.01) |
| *C04B 35/64* | (2006.01) |
| *C04B 41/00* | (2006.01) |

(52) U.S. Cl.
CPC .......... *C04B 35/58* (2013.01); *C01B 21/0825* (2013.01); *C04B 35/581* (2013.01); *C04B 35/6261* (2013.01); *C04B 35/64* (2013.01); *C04B 35/6455* (2013.01); *C04B 41/0072* (2013.01); *C01P 2006/80* (2013.01); *C04B 2235/3895* (2013.01); *C04B 2235/602* (2013.01); *C04B 2235/72* (2013.01); *C04B 2235/763* (2013.01); *C04B 2235/77* (2013.01)

(58) Field of Classification Search
None
See application file for complete search history.

(56) References Cited

U.S. PATENT DOCUMENTS

| | | | |
|---|---|---|---|
| 4,481,300 A * | 11/1984 | Hartnett | C01B 21/0825 264/1.21 |
| 4,520,116 A | 5/1985 | Gentilman et al. | |
| 4,686,070 A * | 8/1987 | Maguire | C01B 21/0825 264/1.21 |
| 5,231,062 A | 7/1993 | Mathers et al. | |
| 5,810,936 A | 9/1998 | Leung et al. | |
| 5,959,409 A | 9/1999 | Dornfest et al. | |
| 6,408,786 B1 | 6/2002 | Kennedy et al. | |
| 6,447,937 B1 | 9/2002 | Murakawa et al. | |
| 6,508,911 B1 | 1/2003 | Han et al. | |
| 6,712,927 B1 | 3/2004 | Grimbergen et al. | |
| 6,830,622 B2 | 12/2004 | O'Donnell et al. | |
| 6,916,559 B2 | 7/2005 | Murakawa et al. | |
| 7,119,032 B2 | 10/2006 | Ji et al. | |
| 7,163,656 B1 * | 1/2007 | Gilde | C04B 35/117 264/667 |
| 7,300,537 B2 | 11/2007 | O'Donnell et al. | |
| 7,459,122 B2 | 12/2008 | Chu et al. | |
| 7,648,782 B2 | 1/2010 | Kobayashi et al. | |
| 8,211,356 B1 | 7/2012 | Hartnett et al. | |
| 8,357,262 B2 | 1/2013 | Nakahara et al. | |
| 8,367,227 B2 | 2/2013 | Sun et al. | |
| 2005/0118086 A1 * | 6/2005 | Miao | C01B 21/0825 423/385 |
| 2009/0056626 A1 | 3/2009 | Thakur et al. | |
| 2009/0068845 A1 | 3/2009 | O'Donnell | |
| 2011/0135915 A1 | 6/2011 | Lee et al. | |
| 2013/0122156 A1 | 5/2013 | Fisk et al. | |
| 2013/0284373 A1 | 10/2013 | Sun et al. | |
| 2013/0337993 A1 * | 12/2013 | Lee | C04B 35/581 501/152 |
| 2014/0178679 A1 | 6/2014 | Gunda | |

* cited by examiner

*Primary Examiner* — Mary F Theisen

(57) ABSTRACT

A method of making high purity crystalline AlON bodies by synthesizing and calcining AlON powders having less than 80 ppm Si, Mg, Ca, Na, and K impurities. The AlON powders are milled to reduce the particle size of the AlON powders using a high purity milling media. An AlON body is formed from the milled AlON powders. Such AlON bodies are particularly suitable for semiconductor process chamber components.

20 Claims, 3 Drawing Sheets

METHOD OF MAKING HIGH PURITY POLYCRYSTALLINE ALUMINUM OXYNITRIDE BODIES USEFUL IN SEMICONDUCTOR PROCESS CHAMBERS

RELATED APPLICATIONS

This application claims benefit of and priority to U.S. Provisional Application Ser. No. 61/894,968 filed Oct. 24, 2013 under 35 U.S.C. §§119, 120, 363, 365, and 37 C.F.R. §1.55 and §1.78 and incorporated herein by this reference.

FIELD OF THE INVENTION

This invention relates to high purity polycrystalline aluminum oxynitride bodies produced via a method which renders the bodies suitable for semiconductor process chambers in one example.

BACKGROUND OF THE INVENTION

The problem with highly corrosive gases employed in semiconductor chambers is well documented. Some gases (for example halogen gasses such as fluorine) can corrode the internal components of the chambers. See, for example, U.S. Pat. No. 7,119,032 (incorporated herein by this reference). Disclosed in the above patent are several prior attempts to provide corrosion resistant chamber components as well as a proposal to use layered superlattice materials as a protective barrier on the surfaces of the internal components of a process chamber. See also U.S. Pat. Nos. 5,959,409; 5,810,936; 6,408,786; 6,508,911; 6,447,937; 6,830,622; 6,916,559; 7,300,537; 7,648,782; 8,357,262; U.S. and Patent Application Nos. 2009/0056626; 2011/0135915; and 2013/0122156 all of which are incorporated herein by this reference.

In U.S. Patent Application No. 2014/0178679 (also incorporated herein by this reference) proposed is an aluminum oxynitride (AlON) coating (with an optional yttria overlying coating) for process chambers. The coating is sputtered to a thickness of 1 to 10 microns. The composition is reported to be 41% Al, 57% O, and 2% N. Potential issues with such a proposal are that the thin coating may not have a long life and thicker coating may be expensive to produce. Furthermore, thicker coatings (greater than few microns) generally have significant amounts of internal stresses which then contribute to bonding failures between the coating and the substrate. If the coating wears away to reveal the underlying substrate, the substrate is then subject to corrosion.

Also, the disclosed AlON coating is amorphous. That means it is not aluminum oxynitride with a gamma-AlON cubic spinel structure; rather it is a mixture of aluminum, oxygen and nitrogen without crystallinity for the most part. Coefficient of thermal expansion mismatch problems may also be present. Because of the low 2.0% N content, the coating could degrade at high temperature and/or could erode in the presence of corrosive gases.

Those skilled in the art have also proposed methods of making AlON bodies. U.S. Pat. No. 7,459,122 (incorporated herein by this reference) proposes a method of making AlON transparent armor. Impurities in these AlON bodies such as boron oxide, silica, titania, and the like, however, render such AlON material unsuitable for process chambers. In the process disclosed, a mixture of alumina, AlN, $SiO_2$, and $B_2O_3$ powders are milled using high purity alumina balls.

In U.S. Pat. No. 8,211,356 (incorporated herein by this reference) by the assignee hereof, AlON powders are milled to ultimately produce polycrystalline AlON bodies proposed for ballistic armor, optical windows, and the like. Normally, high purity aluminum oxide or AlON media are not used in the milling process because such media is expensive and does not offer good wear resistance compared to less pure commercially available media. Commercially available milling media typically contains significant amounts of Si, Mg, Ca, Na, and K impurities which are then introduced into the AlON bodies. Such impurities may then contaminate the wafers processed in the process chambers.

SUMMARY OF THE INVENTION

In light of the prior art noted above in the Background section, a polycrystalline AlON body (a gamma-AlON cubic spinel structure) is needed for processing chamber components which can withstand the highly corrosive gases used in such chambers and which does not include any impurities which could contaminate the wafer substrates processed in the process chamber. The monolithic AlON bodies could be used and/or formed into components including chamber walls and liners, dielectric windows and process kits components such as insert rings, focus rings, and capture rings, electrostatic clamps and heater surfaces, and the like.

Other uses for such highly pure, polycrystalline AlON bodies are within the scope of the invention. Examples include laser windows, solid state laser gain material, and as photoluminiscent material, for example, scintillation, phosphorescence and fluorescence (with the appropriate dopants).

Featured is a method of making high purity crystalline AlON bodies. In one example, AlON powders having less than 80 ppm Si, Mg, Ca, Na, and K impurities are synthesized and calcined. The method may include milling the AlON powders to reduce the particle size of the AlON powders using a high purity milling media and forming an AlON body from the milled AlON powders.

In one example, the milling media includes AlON having less than 80 ppm Si, Mg, Ca, Na, and K impurities and/or aluminum oxide with a purity of 99.9% or greater. Calcined AlON powders may have less than 20 ppm Si, and less than 20 ppm of Mg, Ca, Na, and K. Preferably, the calcined AlON powders have less than 10 ppm Si, Mg, Ca, Na, and K impurities.

The method is preferably adapted to incorporating the AlON bodies into a semiconductor processing chamber. Forming an AlON body may include controlled green forming using a mold made of polymeric materials or high purity aluminum oxide. Preferably, the AlON body is aluminum oxynitride with a gamma-AlON cubic spinel structure. The AlON body preferably has a composition $Al_{(23-x/3)}O_{(27+x)}N_{(5-x)}$ where x is between 0.429 and 2. In one example, the AlON body has a composition 35-45 atomic percent aluminum, 45-55 atomic percent oxygen, and 5.5-9.1 atomic percent nitrogen.

Also featured is a method of making high purity crystalline AlON bodies for semiconductor process chamber components. The preferred method includes synthesizing substantially pure AlON powders by blending high purity aluminum oxide powders with carbon black and heat treating the blended mixture in a nitrogen atmosphere. The mixture is calcined to produce AlON powders having less than 80 ppm Si, Mg, Ca, Na, and K impurities. The AlON powders are milled to reduce the particle size of the AlON powders using a high purity milling media. A semiconductor process chamber component is made by controlled green forming of the milled powders and includes heat treatment and densification to produce a polycrystalline AlON chamber component with a gamma-AlON cubic spinel structure having a composition including 35 to 45 atomic percent aluminum, 45-55 atomic percent oxygen, and 5.5 to 9.1 atomic percent nitrogen.

Also featured is a method of making high purity crystalline AlON bodies comprising synthesizing and calcining AlON powders having less than 80 ppm Si, Mg, Ca, Na, and K impurities; milling the AlON powders to reduce the particle size of the AlON powders using a high purity milling media; and forming an AlON body including green forming using a mold made of polymeric materials or high purity aluminum oxide and heat treating and densifying the AlON body to have a gamma-AlON cubic spinel structure with a composition 35-45 atomic percent aluminum, 45 to 55 atomic percent oxygen and 5.5 to 9.1 atomic percent nitrogen.

The subject invention in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
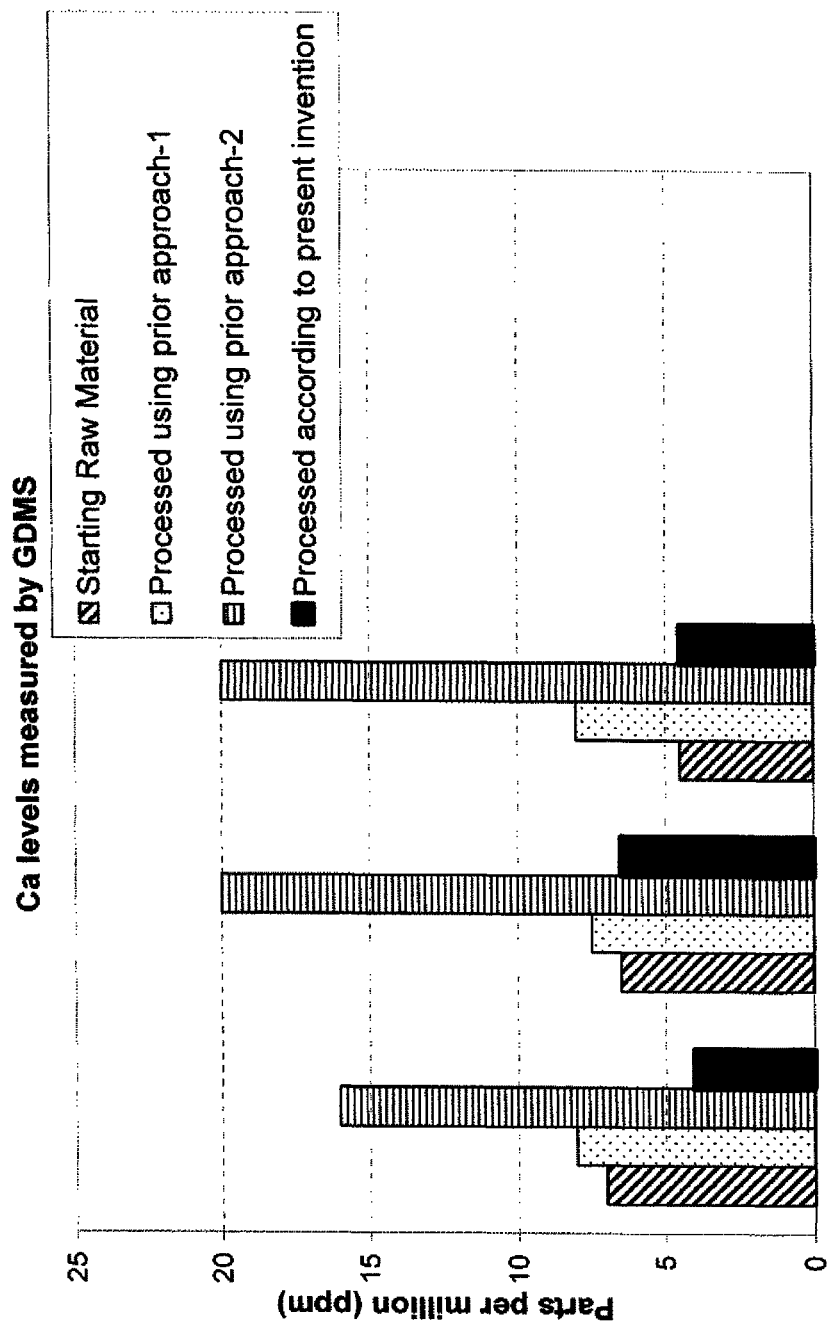
FIG. 1 is a comparison of calcium (Ca) impurity levels in an AlON body made according to one embodiment of the present invention with Ca levels in starting raw material and AlON made using regular powder processing approaches.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Featured is a polycrystalline AlON body which can withstand the highly aggressive and reactive conditions within semiconductor processing chambers and such a polycrystalline AlON body which is produced without using high levels of impurities such a Si, Mg, Ca, Na and K which could contaminate the semiconductor wafers processed in chambers incorporating the new AlON material.

Figure 2:
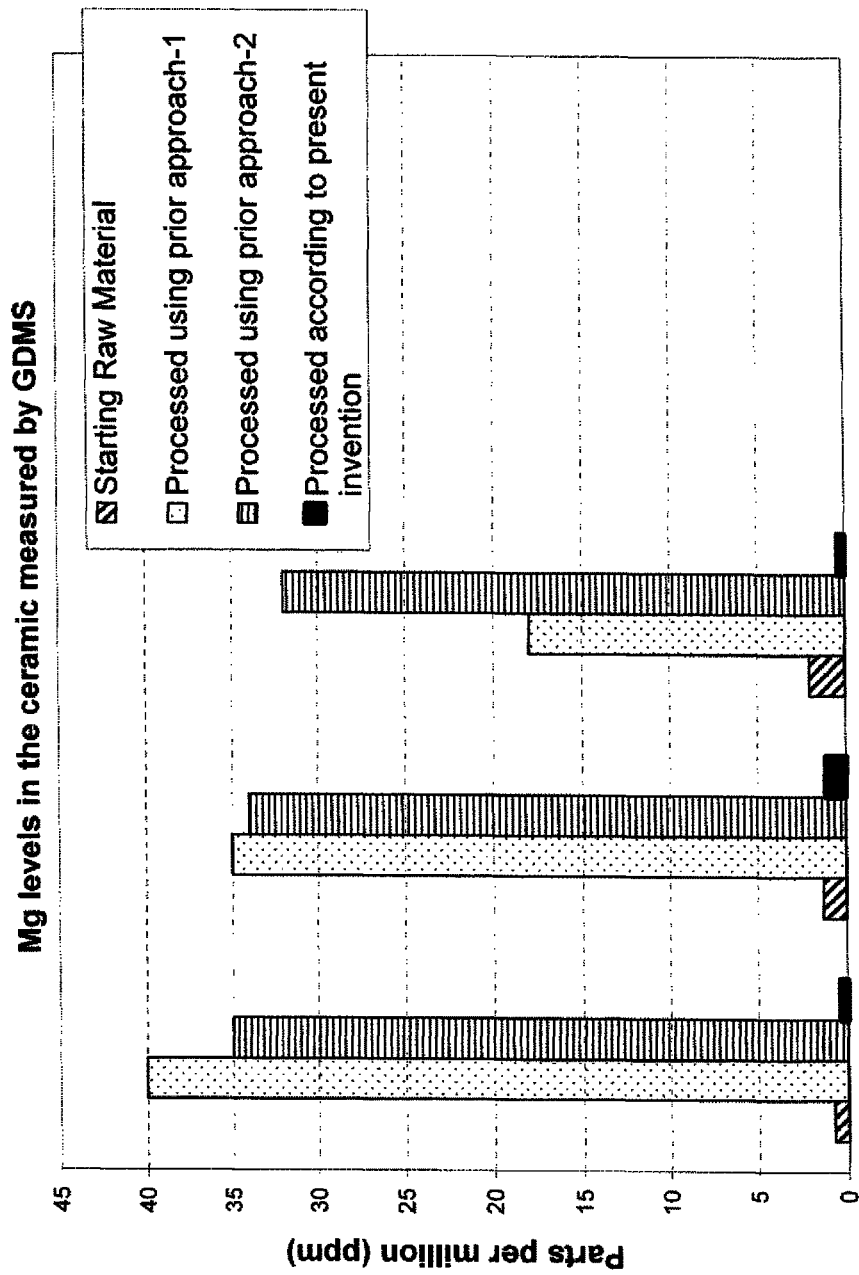
FIG. 2 is a comparison of magnesium (Mg) impurity levels in a AlON body made according to one embodiment of the present invention with the Mg levels in the starting raw material and AlON bodies made using regular powder processing prior art powder processing approaches.
Figure 3:
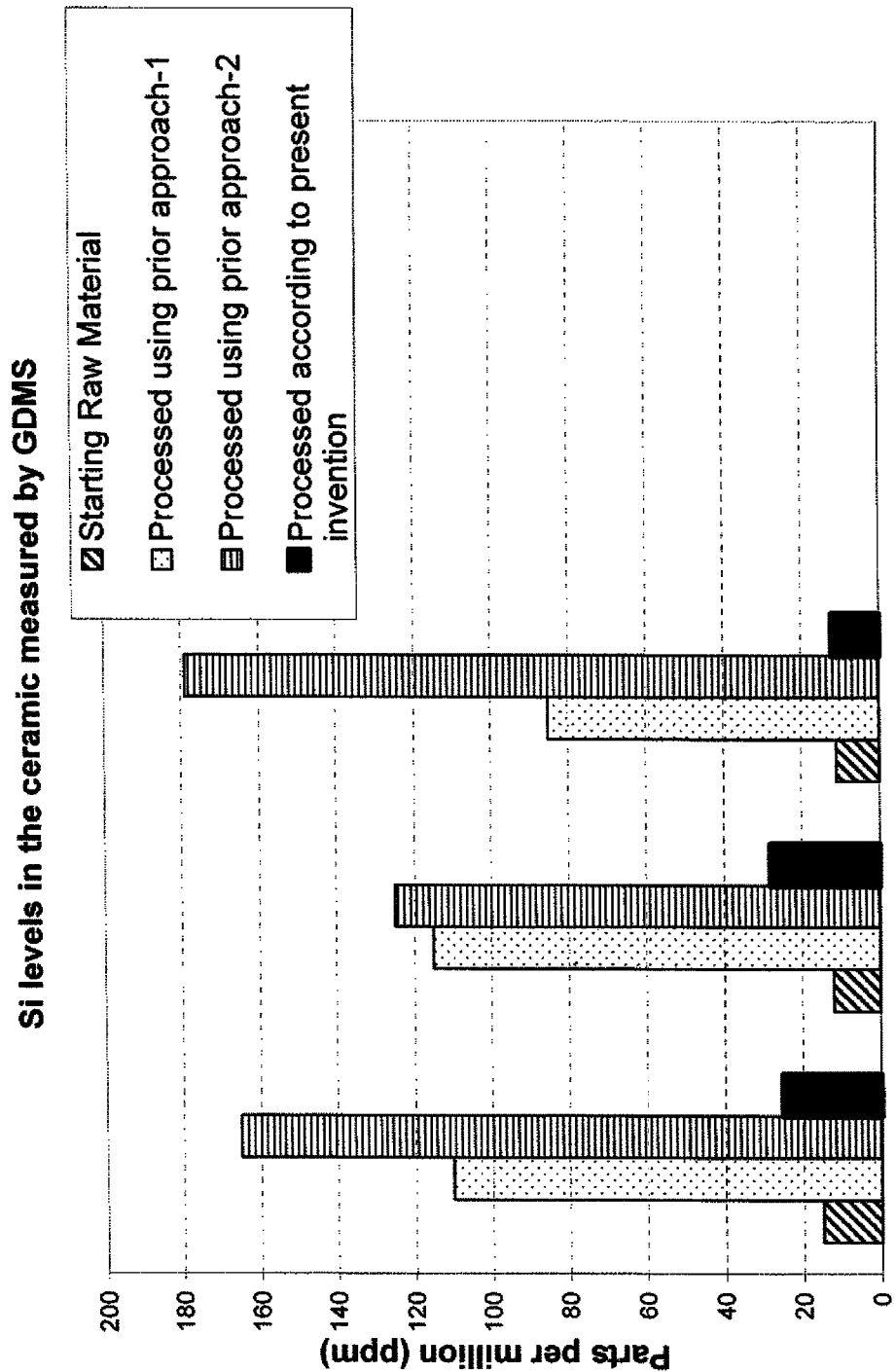
FIG. 3 is a comparison of silicon (Si) impurity levels in an AlON body made according to the present invention with the Si level in the starting raw material and AlON bodies made using prior art powder processing approaches.

In FIGS. 1-3, the Ca, Mg, and Si levels in the raw starting materials and in the AlON body processed using prior art approaches in which less purity alumina media (less than or equal to 96% purity) was used to mill the AlON powders before green body formation are compared to the corresponding levels of these undesirable impurities in an AlON body produced by the methods described below in relation to preferred embodiments of the invention.

Preferably, the Si content in the crystalline AlON body is less than 80 ppm, preferably less than 40 ppm and, in one preferred embodiment, preferably less than 20 ppm. The impurity content of Mg, Ca, Na, and K is preferably under 20 ppm of each and, in one preferred embodiment preferably under 10 ppm of each. Plasma process chamber components for semiconductor applications are processed using special powder processing approaches which result in extremely low impurity contents of Si, Mg, Ca, Na, and K in the final densified crystalline AlON body. As shown in the examples of FIGS. 1-3, the Si, Mg, and Ca contents in the dense crystalline AlON body produced according to the current invention are 25, 1, and 4 ppm, respectively, whereas processed AlON bodies using prior art approaches had significantly higher levels of Si, Mg, and Ca compared to the starting raw material.

In one aspect, controlled milling and green forming followed by heat treatment is used to produce a highly pure crystalline AlON body. If yttria powders are added to the AlON powders (e.g., 0.1% to 55%), the result is an AlON-yttria composite body with improved corrosion resistance. Controlled milling involves uses of milling media either made out of the same material that is being milled or aluminum oxide with 99.9% purity in a liquid medium or dry. Controlled green forming involves a compaction approach using molds made out of organic material or colloidal processing such as slip casting or gel casting with proper precautions such as using the molds made out of polymeric materials, high purity aluminum oxide, or other substantially pure molds to avoid any contamination from the molds. After heat treatment, densified AlON (>95% of theoretical density) will either have the same level of impurities as the starting raw material or a lower or slightly higher level.

In accordance with one method, substantially pure AlON powders are synthesized and calcined. AlON powder synthesis includes the steps of blending high purity (99.9% or greater) aluminum oxide powders with carbon black and heat treating the blended mixture in nitrogen atmosphere at high temperatures. Typically, the resulting product is a mixture of AlON and small amounts of carbon black, AlN and aluminum oxide. The product is then subjected to calcination to burn off or oxidize small amounts of carbon black in the powder ultimately producing powder with >90% AlON and less than 100-200 ppm of carbon. Preferably, the substantially pure AlON powders have less than 80 ppm Si, Mg, Ca, Na, and K impurities. The calcined material is then milled to reduce the particle size using a high purity milling media. In one example, the milling media includes dense AlON having less than 40 ppm Si, Mg, Ca, Na, and K impurities. In another example, the milling media includes dense aluminum oxide with a purity of 99.9% or greater. The milling media may be in the shape of balls, cylinders, rods, and/or satellites. Preferably, the milling media can remain in the mixture for further processing.

As noted previously, typical commercially available milling media includes unacceptably high levels of impurities such as Si, Mg, Ca, Na, and K. Most commonly used commercially available alumina media is 94-96% alumina with major portion of the remainder (4-6%) being $SiO_2$. Silica is generally added to increase the fracture toughness of the media which results in improved wear resistance. Improved wear resistance results in better and faster milling particularly when milling hard ceramic materials such as AlON. The high purity milling media used in the invention on the other hand typically not preferred because of lower wear resistance, high cost and may require a longer milling time because the high purity milling media used herein is not as an effective milling media as commercially available milling media with unacceptable levels of the impurities as noted previously.

After milling, these milled, substantially pure AlON powders may be formed into an AlON green body. The methods of U.S. Pat. No. 8,211,356 may be used provided only acceptable levels of impurities (generally <80 ppm) are present in the resulting AlON body. Generally, the AlON body is formed by molding the mixture into a green article having a desired shape applicable to, for example, plasma processing chamber components and tools. This may be accomplished by using a variety of techniques, for example, by injection molding, gel casting, extrusion, 3D printing, cold isostatic pressing (CIP), die pressing, tape casting, roller compaction, or slip casting. Once the green article is formed, it is heat treated and densified to greater than 99% theoretical density.

In certain embodiments, the AlON body of the present invention is made through a process that includes taking the milled substantially pure AlON powders or slurry and adding an organic binder to the slurry the slurry is then screened and spray dried to form a precursor. The precursor, a spray dried powder, is then screened to remove large granules and chunks. The screened precursor is filled into a mold and isostatically pressed to form a green article having a desired shape or to a blank, which then can be machined to desired shape and size. The green article is then heated slowly to remove the organic binder and other additives, and then sintered to about 96 to 99% density relative to theoretical density to achieve closed porosity. Optionally, the sintered article is then hot isostatically pressed (HIP) to further densify it to greater than 99% of its theoretical density. Such AlON bodies produced according to the present invention preferably have the nominal composition of $Al_{(23-x/3)}O_{(27+x)}N_{(5-x)}$, x being comprised between 0.429 and 2. More preferably, the composition is 35 to 45 atomic % Aluminum, 45 to 55 atomic % Oxygen, and 5.5 to 9.1 atomic % Nitrogen and a gamma-AlON cubic spinel structure is preferred.

With silicon and other wafers currently being processed to include nanometers scale lines in micro chips, contamination from such impurities is to be avoided. The result here is a processing chamber which can now withstand highly corrosive reaction gases by virtue of the crystalline AlON components used therein. And, because any impurities present are at such low levels, contamination of the waters being processed is less likely.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A method of making greater than 99.9% purity crystalline AlON bodies comprising:
   Synthesizing and calcining AlON powders having less than 80 ppm of each of the Si, Mg, Ca, Na and K impurities;
   Milling said AlON powders to reduce the particle size of the said AlON powders using a greater than 99.9% purity milling media; and
   Forming an AlON body from said milled AlON powders.

2. The method of claim 1 in which said milling media includes AlON having less than 40 ppm of each of the Si, Mg, Ca, Na, and K impurities.

3. The method of claim 1 in which said milling media includes aluminum oxide with a purity of 99.9% or greater.

4. The method of claim 1 in which the calcined AlON powders have less than 20 ppm Si.

5. The method of claim 1 in which the calcined AlON powders have less than 20 ppm of each of the Mg, Ca, Na, and K.

6. The method of claim 5 in which the calcined AlON powders have less than 10 ppm of each of the Si, Mg, Ca, Na, and K impurities.

7. The method of claim 1 further including incorporating said AlON body into a semiconductor processing chamber.

8. The method of claim 1 in which forming an AlON body includes controlled green forming using a mold made of polymeric materials or high purity aluminum oxide.

9. The method of claim 1 in which the AlON body is aluminum oxynitride with a gamma-AlON cubic spinel structure.

10. The method of claim 9 in which the AlON body has a composition $Al_{(23-x/3)}O_{(27+x)}N_{(5-x)}$ where x is between 0.429 and 2.

11. The method of claim 9 in which the AlON body has a composition 35-45 atomic percent aluminum, 45-55 atomic percent oxygen, and 5.5-9.1 atomic percent nitrogen.

12. A method of making greater than 99.9% purity crystalline AlON bodies for semiconductor process chamber components, the method comprising:
   synthesizing substantially pure AlON powders by blending high purity aluminum oxide powders with carbon black and heat treating the blended mixture in a nitrogen atmosphere;
   calcining the mixture to produce AlON powders having less than 80 ppm of each of the Si, Mg, Ca, Na, and K impurities;
   milling said AlON powders to reduce the particle size of said AlON powders using a high purity milling media; and
   forming a semiconductor process chamber component by controlled green forming of the milled powders including heat treatment and densification to produce a polycrystalline AlON chamber component with a gamma-AlON cubic spinel structure having a composition including 35 to 45 atomic percent aluminum, 45-55 atomic percent oxygen, and 5.5 to 9.1 atomic percent nitrogen.

13. The method of claim 12 in which said milling media includes AlON having less than 40 ppm of each of the Si, Mg, Ca, Na, and K impurities.

14. The method of claim 12 in which said milling media includes aluminum oxide with a purity of 99.9% or greater.

15. The method of claim 12 in which forming includes controlled green forming using a mold made of polymeric materials or high purity aluminum oxide.

16. A method of making greater than 99.9% purity crystalline AlON bodies comprising:
    synthesizing and calcining AlON powders having less than 80 ppm of each of the Si, Mg, Ca, Na, and K impurities;
    milling said AlON powders to reduce the particle size of said AlON powders using a high purity milling media; and
    forming an AlON body including green forming using a mold made of polymeric materials or high purity aluminum oxide and heat treating and densifying the AlON body to have a gamma-AlON cubic spinel structure with a composition 35-45 atomic percent aluminum, 45 to 55 atomic percent oxygen and 5.5 to 9.1 atomic percent nitrogen.

17. The method of claim 16 in which said milling media includes AlON having less than 40 ppm of each of the Si, Mg, Ca, Na, and K impurities.

18. The method of claim 16 in which said milling media includes aluminum oxide with a purity of 99.9% or greater.

19. The method of claim 16 in which the calcined AlON powders have less than 20 ppm Si.

20. The method of claim 16 in which the calcined AlON powders have less than 20 ppm of each of the Mg, Ca, Na, and K.

* * * * *